(12) United States Patent (10) Patent No.: US 8,665,667 B2
He et al. (45) Date of Patent: Mar. 4, 2014

(54) VERTICAL SEISMIC PROFILING VELOCITY ESTIMATION METHOD

(75) Inventors: Ruiqing He, Brea, CA (US); Alex Goertz, Zurich (CH); Martin Karrenbach, Brea, CA (US); Vlad Soutyrine, Fullerton, CA (US)

(73) Assignee: 1474559 Alberta Ltd., Calgary (CA)

( * ) Notice: Subject to any disclaimer, the term of this patent is extended or adjusted under 35 U.S.C. 154(b) by 969 days.

(21) Appl. No.: 12/291,354

(22) Filed: Nov. 8, 2008

(65) Prior Publication Data

US 2010/0118653 A1 May 13, 2010

(51) Int. Cl.
*G01V 1/00* (2006.01)
*G01V 1/28* (2006.01)
*G01V 1/30* (2006.01)

(52) U.S. Cl.
CPC .............. *G01V 1/282* (2013.01); *G01V 1/303* (2013.01)
USPC .......................................................... 367/73

(58) Field of Classification Search
USPC .......... 367/57, 73; 702/1, 2, 6, 11–14, 16, 18, 702/127, 187, 189; 703/6, 9, 10; 181/101, 181/102, 108, 113, 122; 73/152.01, 152.02, 73/152.05, 152.06; 166/244.1, 250.01, 166/254.1; 175/40, 50; 250/253; 324/323

See application file for complete search history.

(56) References Cited

U.S. PATENT DOCUMENTS

2009/0122646 A1* 5/2009 Lou et al. ......................... 367/57

* cited by examiner

*Primary Examiner* — Krystine Breier
(74) *Attorney, Agent, or Firm* — Murray Tech Law; Kenneth A. Murray; Jay S. Jongjitirat (57) ABSTRACT

A computer-implemented method includes providing a first velocity model obtained from a vertical seismic profile survey representative of an upper region of a subterranean formation. Wavefields from the first velocity model are datumed using wave equations to a datum line between the upper region and a target area beneath the upper region to obtain datumed wavefields. The method further includes obtaining interferometric common shot data and interferometric common midpoint data from the datumed wavefield using wave equations at the datum line. The first velocity model, the datumed wavefield, wavefield equations, and the interferometric common midpoint data are then used to generate a second velocity model representative of velocities in the target area.

5 Claims, 7 Drawing Sheets

Fig. 7

VERTICAL SEISMIC PROFILING VELOCITY ESTIMATION METHOD

BACKGROUND

Vertical seismic profiling (VSP) is a seismic tool that can be used to provide high resolution imaging of a region of a subterranean formation, and is typically used to image petroleum reservoirs. VSP imaging differs from surface seismic imaging in that during VSP data collection, one of the source or the receiver (typically, the receiver) is placed in a borehole in the formation, rather than having the source and receiver both located at the surface. Commonly, a string of geophones or other sensing devices, which act collectively as the receiver, are placed within a borehole during VSP data acquisition. The source can be located at the surface, or in another borehole (in which case the imaging is known as cross-well VSP, also known as cross-well tomography). In the case of an offshore (subsea) reservoir, the source is commonly an air gun placed in the water at or near the surface of the water. If sources are activated in a borehole and the sensing device is located at the surface the configuration is known as Reverse VSP. In the following invention, the meaning of sources and receivers can be interchanged without changing the method itself and is thus applicable to VSP as well as Reverse VSP.

The receiver or receivers in the borehole receive seismic energy produced by the source. The seismic energy arrives at each receiver both as upgoing waves and as downgoing waves. The receiver converts the detected energy into signals which are then transmitted to a data collection location. The signals are typically converted from analog signals to digital signals. The set of digital signals form a VSP data set representative of a region of the formation. This unprocessed VSP data can then be processed using known processing techniques to produce a model of the region, which can be stored on computer readable medium as VSP image data. The VSP image data can be used to generate visual images of the region, and can also be used for computer simulations and the like. Frequently VSP data is augmented with data from a surface seismic survey to produce a higher quality image of a portion of the formation. The seismic image is generated as a result of interaction (reflections, diffractions, conversion, mostly) between the seismic energy from the source and events and structures within the subterranean formation, as well as traveltime of the signals from the source to the receiver (directly or indirectly). An example of a subterranean structure is a geological feature such as a dip, a fold, or a transition from one rock type to another (e.g., from sandstone to granite). A subterranean event can include not only geological features, but also a change in physical properties (e.g., density, porosity, etc.) within the same rock strata. Traveltime is also affected by changes in physical properties within the formation, typically as a function of depth.

The process of seismic interferometry is a method commonly used that retrieves the response of a virtual source by cross correlating responses at two receivers. Interferometry examines the general interference phenomena between pairs of signals in order to gain useful information about the subsurface. Seismic interferometry is used to estimate the detailed properties of media by analyzing the interference patterns of seismic waves. Seismic interferometry utilizes the crosscorrelation of signal pairs to reconstruct the impulse response of a given media. Jon Claerbout's initial (1968) conjecture provided the framework upon which modern interferometric theory is based. Using commonly known seismic interferometry methods, a signal at a first location can be crosscorrelated with a signal at a second location to reproduce a virtual source-receiver pair.

Generally, traveltime is the time lapse between the generation of a seismic signal at a source location and the time at which a seismic receiver receives the signal. As can be appreciated, the density of a geologic formation through which a seismic signal travels has a significant impact on traveltime. A seismic signal will travel faster through a dense formation than it will through a less dense formation. It is therefore very desirable to know the density of a formation through which a seismic signal will travel in order that received signals can accurately indicate the total distance traveled by the signal from the source location prior to being received at a receiver. That is, since the essential objective of reflection seismology is to determine the location (depth) of events in a target area, it is important to have a reasonable approximation or model of the velocities of the different strata involved in the seismic survey. Complicating this process of developing the velocity model is the fact that a geologic formation through which a seismic signal may travel (prior to being received at a receiver) is often not a single layer of a homogeneous material. Rather, the geologic formation typically consists of multiple layers each having different physical properties (typically density) which affect the rate at which a seismic signal propagates through the different layers.

Figure 1:
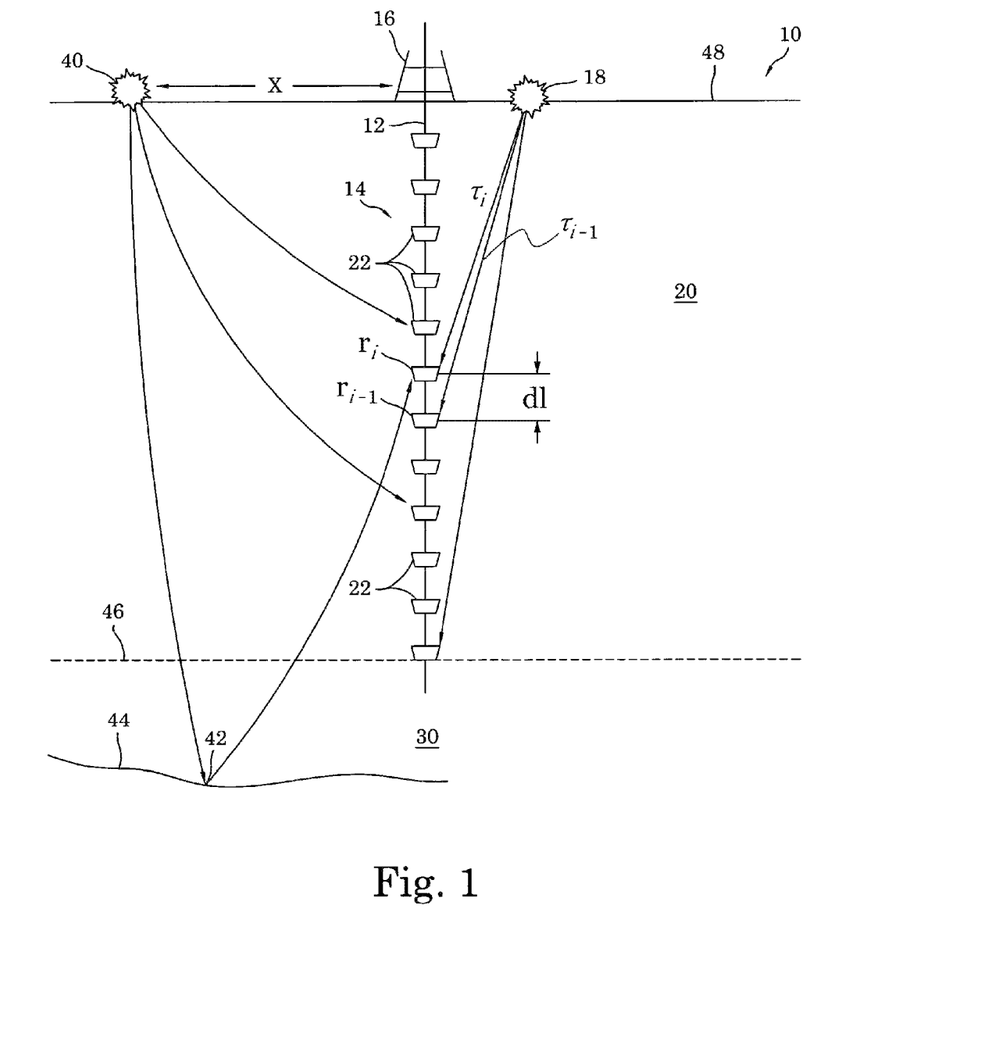
FIG. 1 is a schematic diagram depicting a vertical cross section of a subterranean formation and prior art VSP data collection methods.

In the case of vertical seismic profiling, it is somewhat relatively straight-forward to determine the signal velocities of different geologic layers within the zone of the receiver array. Referring to FIG. 1, a cross section of a subterranean formation 10 is depicted in a side profile view. The subterranean formation 10 is separated into two regions—an upper region 20 in which a receiver array 14 is placed within a wellbore 12, and a lower region or target area 30 in which no receivers are located. The upper region 20 is bounded at the lower level by the lowest geophone level 46. The target area 30 in general represents an area of interest where more information is desired, typically to identify the potential location of hydrocarbon deposits for exploitation. For practical reasons (typically economic—i.e., the cost of drilling, etc.), the wellbore 12 is not extended into the target area 30, and thus the receiver array 14 is deployed within the upper region 20. Within this upper region 20, it is relatively easy to determine the velocities of different layers within this region. Specifically, a zero-offset checkshot seismic source 18 can be provided at or very near the well head 16 of the wellbore 12. The velocity, v, as measured in meters per second (or other designated units) of a seismic signal traveling through a layer can be determined from the equation:

$$v_i = dl_i / d\tau_i$$

where $dl_i$ is the distance between two adjacent receivers 22, identified as $r_i$ and $r_{i-1}$ in the illustration, wherein $r_i$ is the upper receiver 22 and $r_{i-1}$ is the lower receiver 22. Further, $d\tau_i$ is the time difference from reception of the source signal at the upper receiver 22, $r_i$, to when the receiver 22, $r_{i-1}$, receives the same source signal. Since the distance, $dl_i$, between any given receiver, $r_i$ and receiver, $r_{i-1}$, is known, it is possible to determine with some accuracy the various signal velocities within the upper region 20. Of course, the closer the receivers 22 are to one another, the better will be the computed resolution of the signal velocities of the layers within the upper region 20.

In addition to performing a zero-offset survey of the upper region 20 (by providing a source 18 located proximate the wellhead 16 of the wellbore 12), additional velocity information pertaining to both the upper region 20 and the target area 30 can be obtained by performing offset-tomography. In this case, a seismic source 40 is used to generate a seismic signal at a distance "X" from the wellbore 12. Again, since the distances between the source 40 and each of the receivers 22 is known, determining velocities in the upper region 20 is relatively straight forward and somewhat accurate.

However, determining (or approximating) velocities in the target area 30 is somewhat more problematic, since the receiver array 14 does not extend into this area 30. Reflection tomography from an event 44 in the target area 30 will provide signal information to the receiver array 14 indicating the presence of an event 44 in this area, but due to unknowns regarding the velocities and reflector locations in the target area 30, it is difficult to determine accurately the depth of the event reflection point 42 associated with the event 44.

The velocity information received from zero-offset VSP and offset tomography can be supplemented with information from a sonic log of the wellbore 12 if such is available, but such information may be difficult to incorporate since sonic logs are collected at a much higher seismic frequency range than VSP seismic data. Seismic velocity can vary with signal frequency thus causing a comparison of the higher frequency sonic data to VSP data to be indirect. Zero-offset VSP and offset tomography velocity information can also be supplemented with surface seismic velocity analysis information if it is available, but such information lacks the resolution of a VSP survey, and thus does not provide the accuracy desired for improvement of the VSP surveys.

There is therefore a need for a method to improve velocity models used in VSP surveys and associated data processing particularly for determining the presence and location of various seismic reflection or diffraction events within a target area below the depth of an existing wellbore.

DETAILED DESCRIPTION

The methods described herein allow an improved velocity model to be developed for VSP surveys and VSP data imaging. In particular, the methods described herein support the computation of an improved velocity model for determining the location of various seismic events below the lowest depth of a wellbore able to receive a seismic receiver array.

The methods described herein can be performed using computers and data processors. The data described herein can be stored on computer-readable media. Furthermore, the methods described herein can be reduced to a set of computer readable instructions capable of being executed by a computer processor, and which can be stored on computer readable media.

Preferably, when performing the method of the present invention, a reasonably accurate velocity model of the upper region (20, FIG. 1) of the subterranean formation 10 is to be provided. As indicated above, since the upper region 20 by definition contains a wellbore 12, a reasonably accurate velocity model of this region 20 can be achieved by using a receiver array 14 with relatively close receiver 22 spacing, and/or by placing the receiver array 14 at different locations in the upper region 20. Further, it is preferable to have sonic log data and/or a velocity model from surface seismic data for the target area (30, FIG. 1) when performing the method in order to provide an improved initial estimation of signal velocities in the upper region 20.

In the following description, anisotropy and other complications will be ignored for the sake of simplicity. However, it is understood that the development of a complete velocity model for the target area 30 will include these considerations.

Figure 2:
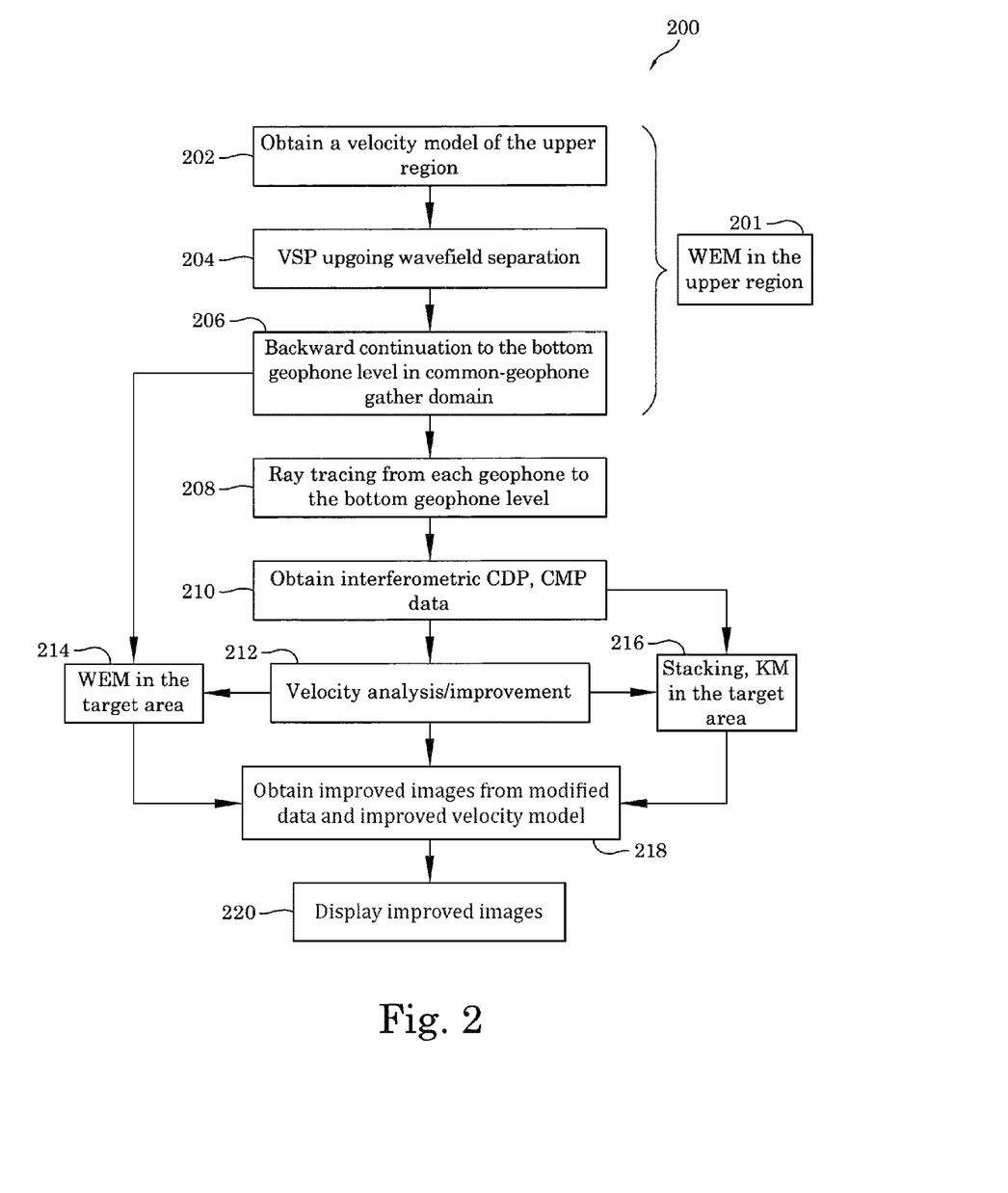
FIG. 2 is a diagram of a flowchart depicting a method in accordance with the present invention.

Turning now to FIG. 2, a flowchart 200 depicts steps that can be performed to accomplish the method of the present invention. The steps depicted in the flowchart 200 can be performed on one or more computers as computer executable program steps. It will be appreciated that the flowchart 200 is exemplary only, and that not all steps depicted are necessary to carry out the method. Further, certain steps depicted can be performed in different order, and additional steps can be added, all within the scope of the overall method.

The flowchart of FIG. 2 depicts five distinct embodiments. The first embodiment begins at step 202 and continues through to step 206, to step 214, and ends at step 220. The second embodiment begins at step 202 and continues through to step 206, to step 212, to step 218, and ends at step 220. The third embodiment begins at step 202 and continues through to step 206, to step 210, to step 216 and ends at step 220. The fourth embodiment begins at step 202 and continues through to step 206, to step 212, to step 214 and ends at step 220. The fifth embodiment begins at step 202 and continues through to step 206, to step 212, to step 216 and ends at step 220.

In step 202, a velocity model of the upper region (20, FIG. 1) is obtained or provided. This can be achieved as per the discussion regarding FIG. 1 provided above. Inherently, this step also includes providing a VSP data set performed using the arrangement of FIG. 1. The VSP data set includes both downgoing wave data (i.e., seismic energy directly from the source 40 to the geophones 22), as well as upgoing wave data (i.e., reflection or diffraction seismic energy from a layer 44 below a geophone 22). Further, the VSP data includes both shear wave (S-wave) data, as well as compression wave (P-wave) data.

In step 204, the reflection data (upgoing wavefield) from the VSP data is separated into data sets containing a single wave type (P-wave, S-waves). This data is separated since the shear waves and the compression waves travel at different velocities in the same media. The method of the present invention leverages the use of one wave type, or both wave types simultaneously, to improve the velocity model.

In step 206 the surface source side of the reflection wavefield (derived from step 204) is backward or downward continued to datum level 46 associated with the bottom geophone 54 (see FIG. 3) in a common-geophone gather domain. In step 201, iterative wave equation migration (WEM) may be applied to refine the velocity model in the upper region 20.

Figure 3:
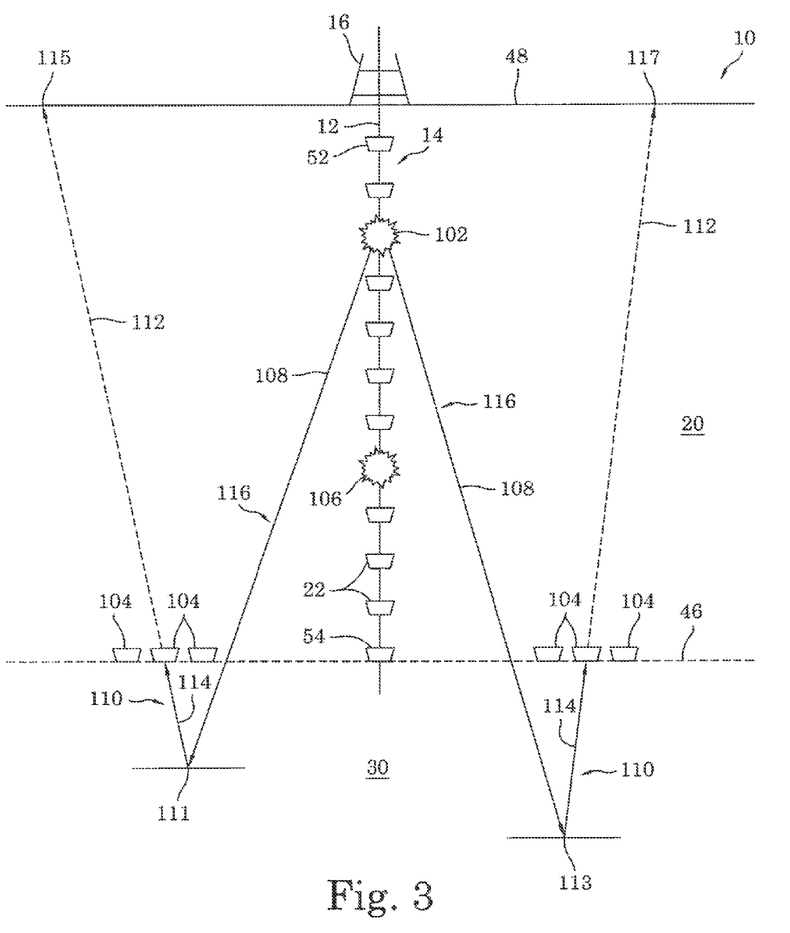
FIG. 3 is a schematic diagram of a side elevation view of the subterranean formation of FIG. 1 depicting a datuming process in the method of the present invention.

Subsequently, at step 208, ray tracing is performed from each of the geophones 22 to the bottom geophone datum level 46.

At step 210, the interferometric stationary phase is computed.

These steps 206, 208 and 210 constitute a downward continuation using wavefield equations (known as wave equation extrapolation and migration, or WEM) from their known state using sources 40 at the surface 48 to project a predicted state at the lower geophone datum level 46. This process is also known as datuming. Datuming has the effect of removing the upper layer 20 from the wavefield, and thus providing a set of wavefields which would result if the VSP survey was performed starting at the lower geophone level 54. Datuming is a known process for surface seismic data, but heretofore has not been applied to VSP seismic data. The process as applied according to the method of the invention computes an extrapolated wavefield that extends below the datum level 46 at the lowest geophone 54 into the target area 30.

As shown in FIG. 2, the datuming process is systematic and iterative and comprises a downward continuation at each geophone 22 level. Each surface source 18, 40 is extrapolated to the location of the uppermost geophone 52 and the datum is moved down to the level of the uppermost geophone 52. The uppermost geophone 52 is then used as the level for the starting point for the next surface source extrapolation toward the next lower geophone 22. This process is continued until the datum for the source side of the VSP wave field has been moved step-by-step from the upper surface 48 to the lower geophone 54 at datum depth level 46, after which the wave field corresponding to the borehole receivers 22 is interferometrically redatumed from each individual borehole geophone level 22 to the datum level 46 of the lowest geophone 54.

More specifically, and referring to FIG. 3, the backward continuation downward of step 206 is performed for all surface source locations 40, 18 at the surface level 48 simultaneously for each geophone 22 in the wellbore 12 independently, starting with the uppermost geophone 52 in the array 14, and ending with the lowest most geophone 54. Subsequently, for each geophone 22, it is assumed that the geophone 22 becomes a virtual seismic source wherein the energy from the wavefield has been extrapolated to the level of each geophone 22 and the energy is presumed to emanate from this location. This extrapolation creates multiple virtual sources associated with the level of each geophone 22 based on reciprocity of the wave equation.

Figure 4:
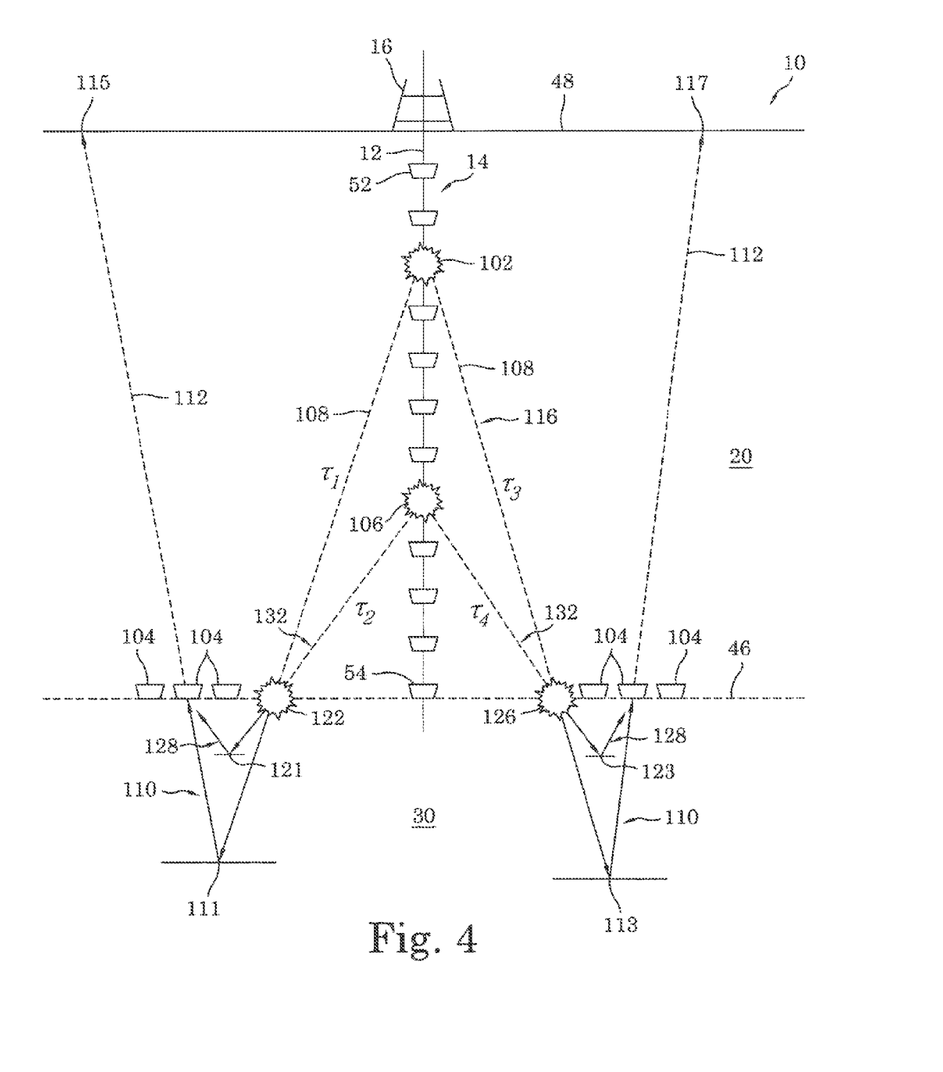
FIG. 4 is a schematic diagram of a side elevation view of the subterranean formation of FIG. 1 depicting a process for obtaining VSP interferometric common depth point data in the method of the present invention.

For exemplary purposes, in the receiver array 14, we show twelve geophones 22 for which twelve separate virtual sources would be computed. For simplicity in description, the method of the invention is illustrated in FIG. 3 and FIG. 4 using computed upper virtual source 102 and computed lower virtual source 106. However, the method of the invention is applied to each geophone 22 within the array 14 and hence, a virtual source is created at the level of each geophone 22. Hence, virtual sources computed for each geophone 22 location will be hereafter referred to as virtual sources 102, 106.

Further, for each downward continuation, also known as a backward continuation, the method of the invention creates one or more hypothetical geophones 104 acting as hypothetical receivers located at the lower geophone datum level 46. Using known information from the VSP survey in the upper region 20, the method of the invention predicts multiple reflection points 111, 113 (and so on, for each virtual source 102, 106 computed for each of the geophones 22 and multiple arrival points 115, 117 (and so on) at the surface 48 associated with each reflection point 111, 113. This computed prediction produces a synthetic wave for each virtual source 102, 106. For example, for virtual source 102, the synthetic waves 116 include a downgoing portion 108, as well as an upgoing portion 110. The upgoing portion 110 of the synthetic waves 116 include an upper segment 112 which is above the lower geophone datum level 46, and a lower segment 114 below the datum level 46 in the target area 30.

It will be noted that the synthetic virtual waves 116 do not merely consist of a continuously straight upgoing portion 110 reflected at the reflection depth points 111, 113 at an equal and opposite angle to the downgoing portion 108. Rather, in the example depicted in FIG. 3, the upgoing portion 110 is calculated as being reflected from the depth points 111, 113 at a slightly less angle than the downgoing portion 108. Further, the upper segment 112 and the lower segment 114 of the upgoing wave 110 are offset by a refraction angle at the lower geophone datum level 46. These differences from pure geometric reflection of the synthetic waves 116 off of the depth points 111, 113 are a result of velocity model estimations used in the modeling of the synthetic waves 116.

The specific predictive modeling steps that can be used for this process of the wave equation extrapolation and datuming in steps 206, 208 and 210 include selecting one or more hypothetical source locations 122, 126 at a location where the downward continued wave field has been created as end result of step 206. Specifically as illustrated in FIG. 4, the newly chosen hypothetical source location 126 is located on the bottom geophone datum level 46. At this hypothetical source location 126, new common shot gathers are synthesized from partially redatumed data by time shifting and stacking selected seismic traces. The required time shifts (for example, segments 132 and 108) are computed using the previously estimated velocity model comprising the region from surface level 48 down to the bottom geophone datum level 46. The time shifts are obtained by ray tracing from the new hypothetical source pointlocation 126 to all borehole locations associated with each geophone 22 from the uppermost geophone 52 through the lowermost geophone 54. In this manner a seismic event originating from reflector 123 or 113 can be composed by considering segments 116, 110 and 108. An unknown number of reflection events may then be predicted and presented in the redatumed data, as illustrated, for example, by an event determined by segments 112, 128 and 132.

Following the surface source-side downward continuation step 206, the resulting seismic data with reciprocal virtual sources 102 located within the borehole 12 are denoted as the modified wave field, comprised of depth common shot gather (DCSG) data according to the multi-dimensional function DCSG ($s_i$, $g_j$, t) denoting the DCSG data set with independent parameters consisting of sources $s_i$, receivers $g_j$, and time t. Then in step 210 interferometric common shot gather data and interferometric common midpoint (CMP) data are obtained.

A specific example of obtaining interferometric common shot gather data is depicted in FIG. 4, which is an extension of FIG. 3. In general, the process of obtaining interferometric shot gather data achieves common depth point (CDP) gather data on the datum line 46 by standard resorting of shot gathers into CDP gathers (i.e., eventually, the lower geophone datum level 46). This CDP data can then be used to improve the velocity model for the target area 30, as will be more fully described below.

Referring to FIG. 4, the process entails computing and locating virtual sources 122, 126 (and so on for the different geophones 22) where the downgoing portion of synthetic waves 116 and 132 intersect one another at the datum line (here, the lower geophone datum level 46). To generate the modified wave fields time shifts are computed from each hypothetical source location 122, 126 to their original virtual source locations 102 and 106 within the receiver array 14 in the borehole 12. $\tau_1$, $\tau_2$, $\tau_3$, and $\tau_4$ represent the travel time for the energy signals from each of the virtual sources 102, 106 to new hypothetical source locations 122, 126 on the datum level 46. For each original virtual source location such as at 102 and 106 and for each datumed location associated with hypothetical receivers 104, a seismic trace exists in the wave field. The datumed locations associated with each hypothetical receiver 104 are typically located on a horizontal grid or at specific subsurface locations. To create a new modified wave field that represents a hypothetical source at reference location 126, (denoted $g_1$ in the formula below), all seismic traces associated with the original virtual source locations 102, 106 are selected, and the previously computed associated time shifts $\tau_{si,g1}$ are applied to those selected traces. Summation for all original sources $s_i$ over the time shifted traces of DCSG ($s_i$, $g_2$, t+$\tau_{si,g1}$) creates a new wave field, comprised of interferometric common shot gather (ICSG) data determined by the equation:

$$ICSG(g_1,g_2,t)=\Sigma s_i DCSG(s_i,g_2, t+\tau_{si,g1})$$

In this manner the stationary phases of individual reflection responses from a reflector 113 and 123 are summed into a common wave field. This process is a data transformation process whose result is an interferometrically computed Common Shot Gather at the reference location 126. Each such common shot gather contains wave field contributions from the datum line 46. The process is repeated for each newly created hypothetical source 122, 126 on the datum level 46.

Figure 5:
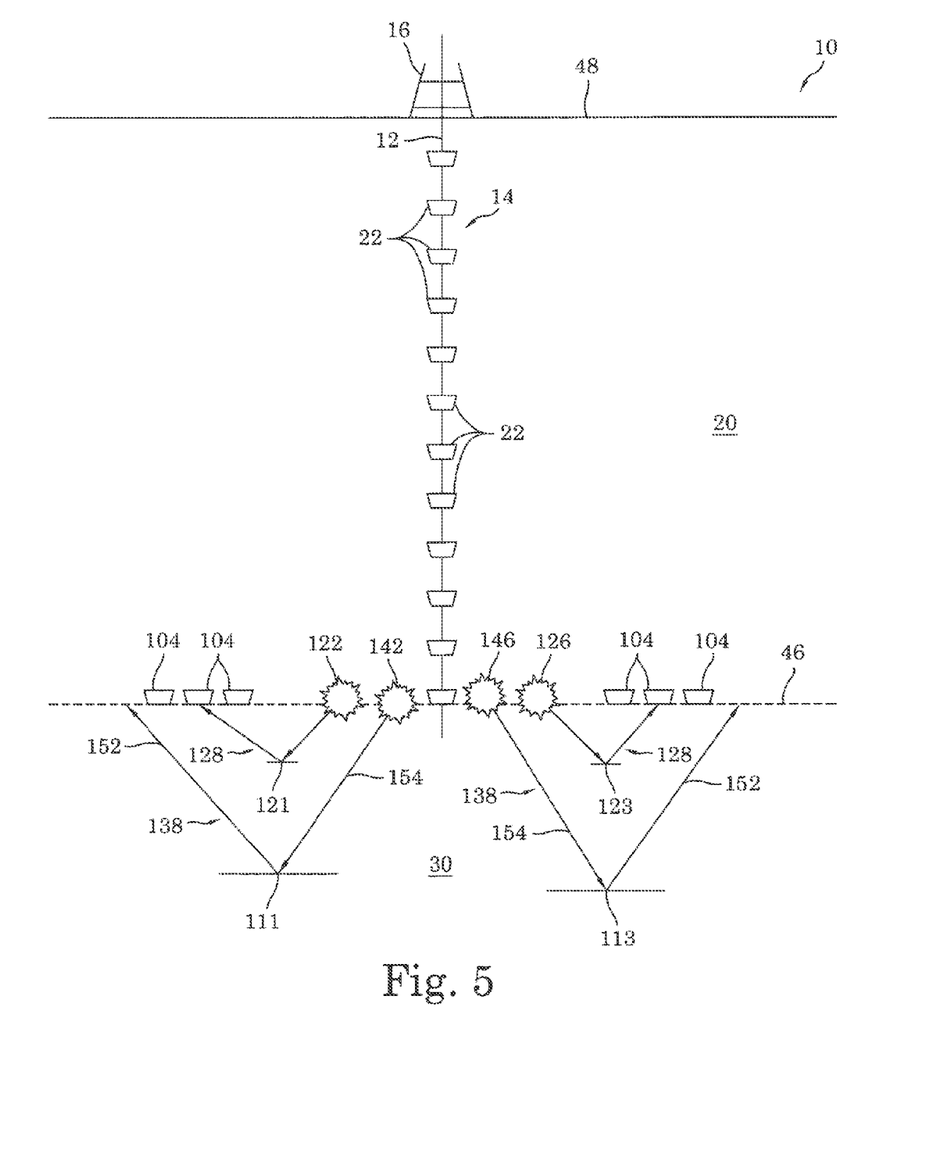
FIG. 5 is a schematic diagram of a side elevation view of the subterranean formation of FIG. 1 depicting a process for obtaining interferometric common midpoint data in the method of the present invention.

A specific example of obtaining interferometric common midpoint (CMP) data set is depicted in FIG. 5, which is an extension of FIG. 4. As can be seen in FIG. 5, the process of obtaining interferometric CMP entails locating hypothetical sources 142 and 146 on the datum line level 46 midpoint between the respective hypothetical sources 122 and 126 (generated in the process of obtaining the interferometric common shot gather data in FIG. 4). A new synthetic wave 138 (comprising downgoing portion 154 and upgoing portion 152) is generated using the new hypothetical sources 142, 146. A new synthetic wave 138 is created for each hypothetical source 142, 146 created in the interferometric shot gather data process. The result is a virtual surface seismic survey along the datum line 46 using hypothetical sources 122, 126, 142, 146 and so on for all of the hypothetical sources created. As is apparent, the more hypothetical sources there are on the datum line 46, the better will be the predictive nature of the velocity model for the target area 30. It will also be observed that synthetic waves 138 illuminate the depth points 111 and 113 from the original VSP survey.

Now, in greater deal, the method of the invention comprises providing a first velocity model derived from a vertical seismic profiling (VSP) survey in an upper region 20 of a subterranean formation 10 defined by the upper region 20 and a target area 30 below the upper region, the upper region 20 containing a wellbore 12 in which a receiver array 14 is placed to obtain vertical seismic profile data (VSP data) representative of the upper region 20. Then, progressively migrating wavefields representative of the obtained VSP data to a datum line 46 defining a boundary between the upper region 20 and the target area 30 using first virtual sources computed for a plurality of geophone positions 22 on the receiver array 14 to thereby obtain wavefields simulating VSP wavefield data obtained at the datum line 46. Herein, two exemplary cases are shown using two virtual sources 102, 106 herein. Subsequently, computing interferometric common shot gather (ICSG) data simulating VSP data obtained by first virtual sources 102, 106 in the wellbore, first hypothetical sources 122, 126 located at the datum line 46, and hypothetical receivers 104 located at the datum line 46.

Still further, developing interferometric common midpoint (CMP) data simulating surface seismic data obtained at the datum line 46 by the first hypothetical sources 122, 126 and third hypothetical sources 142, 146 located on the datum line 46 and hypothetical receivers 104 located along the datum line 46. Second hypothetical sources 142, 146 are shown as being located between the first hypothetical sources 122, 126 and the wellbore 12.

Subsequently, modifying the first velocity model using the migrated wavefields and the interferometric CMP data, to obtain a second velocity model representative of velocities within the target area 30 of the subterranean formation 10; and saving the second velocity model to a computer readable medium.

Still further, iteratively improving the first velocity model using interferometric CMP data, computing migrated wavefield images and assessing image quality and subsequent velocity models representative of velocities of the subterranean formation within the target area 30 and saving each iteration and a final velocity model to a computer readable medium for subsequent processing and display to a user or analyst for further interpretation.

In a further embodiment, performing the above steps on one or more computers.

Figure 6:
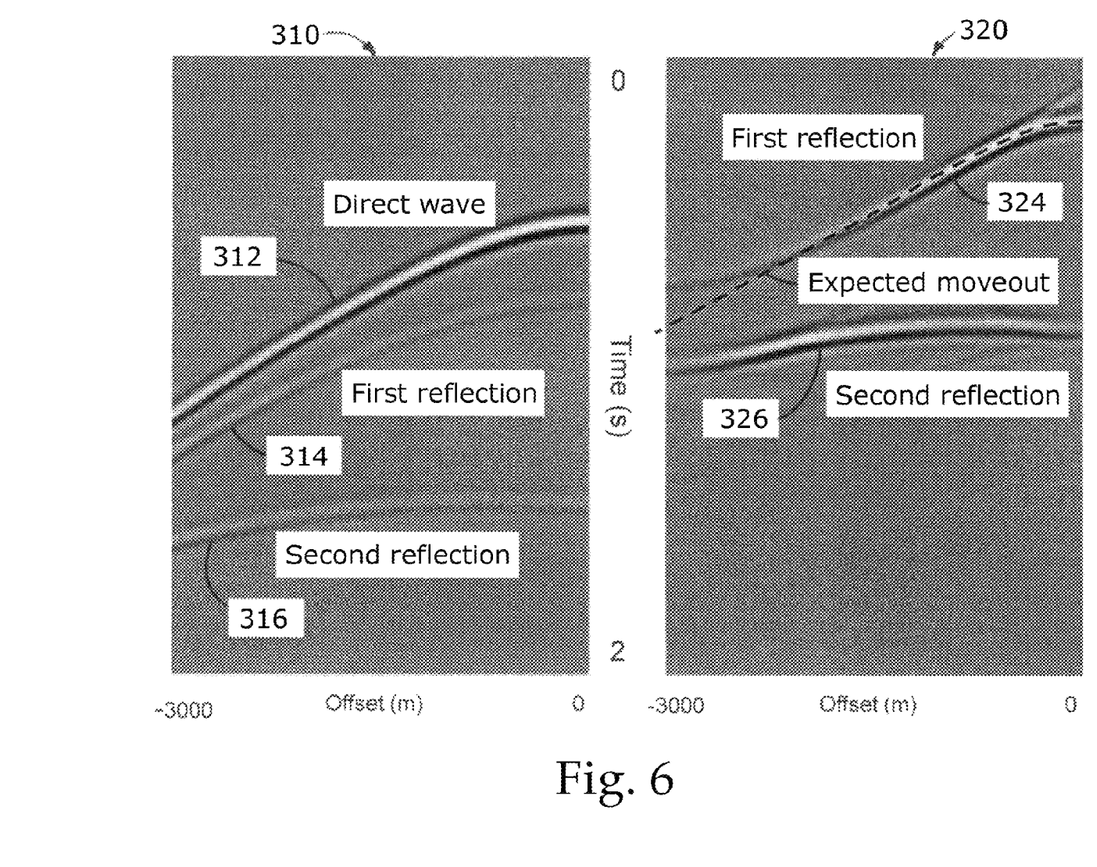
FIG. 6 is an image of a side elevation view of the subterranean formation of FIG. 1 depicting synthetic data and the synthetic data modified using the method of the present invention.

With reference now to FIG. 6, an image of a side elevation view of the subterranean reservoir 10 of FIG. 1 is depicted showing synthetic data 310 and derivative modified synthetic data 320 using the method of the present invention. Here the reflection response of the original VSP data 310 and the interferometrically computed and redatumed data 320 are illustrated. The left panel 310 of FIG. 6 depicts the original VSP data having a direct arrival 312, first reflection 314 from reflection point 111 (FIG. 3) and second reflection 316 from reflection point 113 (also FIG. 3).

After performing the interferometric redatuming process in step 210 of FIG. 2, the method of the invention generates illustration 320 of the redatumed data where there exists no equivalent direct arrival 312 as in 310, and only the first reflection 324 and second reflection 326 are maintained. The time moveout of the first and second reflections 314, 316 of the initial synthetic data 310 to the first and second reflections 324, 326 respectively of the redatumed data 320 has changed to accommodate new hypothetical source locations 122, 142, 146, 126 and hypothetical receiver locations 104 along the datum line 46. In addition, the amplitude distribution is changed, as indicated by the darker nature of lines 324 and 326 of the redatumed data 320 as compared to respective traces 314 and 316 of the synthetic data 310 due to the modification of the original wave field.

Figure 7:
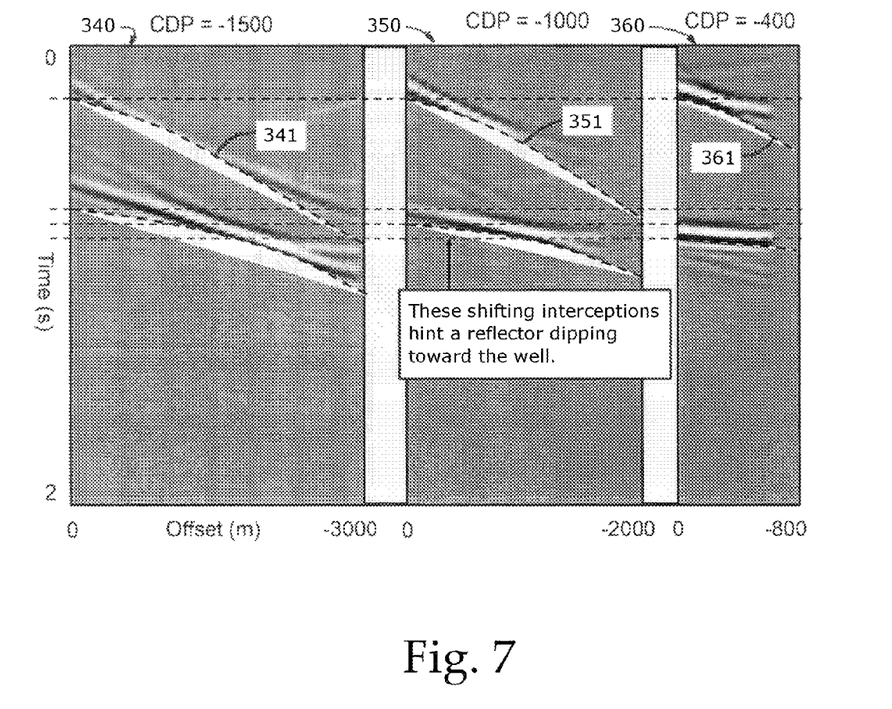
FIG. 7 is an image of a side elevation view of the subterranean formation of FIG. 1 depicting synthetic data representative of a common reflector imaged at three different locations along a common datum using the method of the invention.

Turning now to FIG. 7, the figure depicts three interferometrically computed CMP gathers 340, 350, 360 on the datum line 46, each one at a different hypothetical source location or offset from the wellbore 12. The three gathers are associated with hypothetical source location 142 for gather 350, hypothetical source location 146 for gather 360, and at a hypothetical source point beyond location 142 for gather 340. For a horizontal and dipping reflector, wherein reflectors 241, 251, 261, represent the same reflector as determined by the respective computed CMP gathers 340, 350, 360, there is a seismic reflection response, which in response to the particular VSP wave field illumination has a certain slope, curvature, shape and amplitude distribution, as evidenced in each of the three panels of FIG. 7.

Now, referring again to FIG. 2, at step 212, the reflection and diffraction response characteristics from each of the three locations shown in FIG. 7 are analyzed to improve the velocity model in the vicinity of the target area 30.

In step 212, the interferometric CMP data from step 210 are used to derive an improved velocity model for the target area 30. Standard surface seismic velocity analysis using semblance is not immediately applicable to the interferometric CMP gathers, because the non-stationary stacking energy is left as artifacts in the interferometric CMP gathers. However, these stationary stacking events have stronger energy and can mimic the actual surface seismic data. Hence, an interactive software tool can be used to pick a velocity to match the stationary stacked (strong energy) events in the interferometric CMP gathers illustrated in FIG. 7. Using the Dix's equations, the picked velocities in the time domain can be transformed into interval velocities in the depth domain.

In step 214, now that the wavefields from the original VSP survey have been datumed to the top of the target area 30 as defined by datum level 46, and an improved velocity model obtained, the wavefields can once again be migrated into the target area 30 using the techniques described above for datuming. This step can be described as redatuming, or wavefield migration of the target area 30. In this instance, the redatuming generally follows the datuming and migration process for surface seismic surveys.

In step 216, the results from the original VSP survey can be processed using known seismic data processing methods, including but not limited to, stacking, migration, including Kirchhoff migration (KM), using the velocity model resulting from steps 204-212. Improved images can thus be obtained in step 218 from the modified data and from the improved velocity model in the target area 30 below datum level 46 for subsequent analysis and display to an analyst/interpreter in step 220. Additional velocity improvements can be obtained by analyzing angle domain or offset domain migrated common image gathers. Upon updating the velocity model within the target area 30 again, improved images of the target area 30 can be obtained, analyzed and displayed. This process can continue several times until a certain desired image quality criteria is obtained or the image quality does not change any longer.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims as appropriately interpreted.

We claim:

1. A method comprising:
   (a) providing a first velocity model derived from a vertical seismic profiling (VSP) survey in an upper region of a subterranean formation defined by the upper region and a target area below the upper region, the upper region containing a wellbore in which a receiver array is placed to obtain vertical seismic profile data (VSP data) representative of the upper region;
   (b) progressively migrating wave fields representative of the VSP data to a datum line defining a boundary between the upper region and the target area using first virtual sources located at a plurality of geophone positions on the receiver array, to thereby obtain wavefields simulating VSP wavefield data obtained at the datum line;
   (c) developing interferometric common shot gather data simulating VSP data obtained by the first virtual sources, first hypothetical sources located at the datum line, and hypothetical receivers located at the datum line;
   (d) developing interferometric common midpoint (CMP) data simulating surface seismic data obtained at the datum line by the first hypothetical sources and second hypothetical sources located on the datum line between the first hypothetical sources and the wellbore, and hypothetical receivers located at the datum line;
   (e) modifying the first velocity model using the migrated wavefields and the interferometric CMP data, to obtain a second velocity model representative of velocities of the subterranean formation within the target area;
   (f) saving the second velocity model to a computer readable medium;
   (g) displaying the second velocity model to a user for interpretation and analysis on a computer display where the second velocity model is rendered as an image;
   (h) wherein if the second velocity model is deemed satisfactory to the user, establishing said second velocity model as a final velocity model and terminating any further processing;
   (i) wherein the second velocity model is not yet satisfactory to the user, replacing the first velocity model with the second velocity model; and
   (j) repeating 1(a) through 1(i) until the second velocity model is deemed satisfactory to the user or the user determines that there is no further improvement in the resulting imaged based upon the latest transformation and said second velocity model is determined to be a final velocity model.

2. The method of claim 1 further comprising:
   (a) iteratively improving the second velocity model using the interferometric CMP data;
   (b) computing migrated wave field images;
   (c) assessing image quality associated with the second velocity model representative of velocities of the subterranean formation within the target area;
   (d) saving each second velocity model iteration and the final velocity model to a computer readable medium;
   (e) displaying the image to a user for interpretation and analysis on a computer display; and
   (f) repeating steps 2(a) through 2(e) until the second velocity model image quality is deemed satisfactory to the user or the user determines that there is no further improvement in the resulting image based upon the latest transformation.

3. The method of claim 1 wherein the steps are performed on one or more computers.

4. The method of claim 1 wherein the steps are stored on a computer readable medium as a set of computer executable instructions.

5. The method of claim 1 wherein one or more data sets is generated wherein each of said one or more data sets is stored on a computer readable medium and is further processed for display to a user for additional interpretation and assessment.

* * * * *